R. HICKS.
MANURE CARRIER.
APPLICATION FILED MAR. 16, 1914.

1,144,544.

Patented June 29, 1915.

Witnesses
L. Huber
J. Ross Thomson

Inventor
Robert Hicks
by Lloyd Blackmore Atty.

UNITED STATES PATENT OFFICE.

ROBERT HICKS, OF ROSSETTI, SASKATCHEWAN, CANADA.

MANURE-CARRIER.

1,144,544.

Specification of Letters Patent.

Patented June 29, 1915.

Application filed March 16, 1914. Serial No. 825,192.

*To all whom it may concern:*

Be it known that I, ROBERT HICKS, a subject of the King of Great Britain, and resident of Rossetti, Province of Saskatchewan, Canada, have invented certain new and useful Improvements in Manure-Carriers, of which the following is a specification.

The invention relates to improvements in manure carriers, as described in the present specification, and illustrated in the accompanying drawings that form part of the same.

The invention consists essentially of a mesh strip suitably reinforced, and having draft eyes arranged at the ends thereof, and side-chains for binding the strip into bundle form while being moved.

The objects of the invention are to devise a manure carrier of simple and durable construction, which may be readily arranged behind a row of stalls to remove all manure therefrom at one time, and after carrying the same to any desired place may be conveniently dumped.

Figure 1:
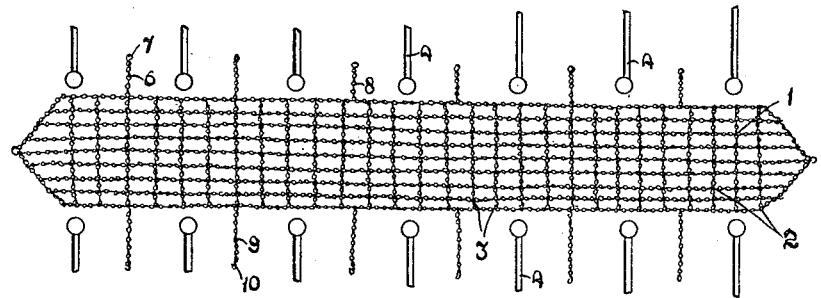
Figure 2:
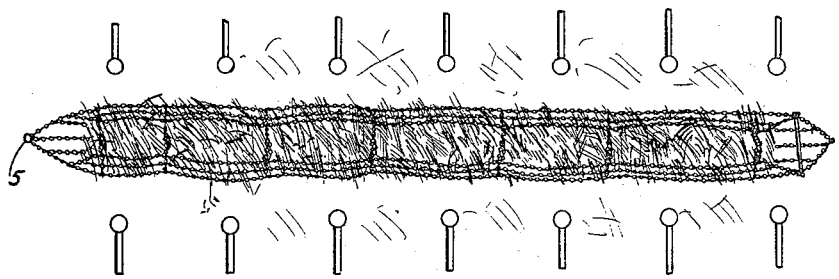
Figure 3:
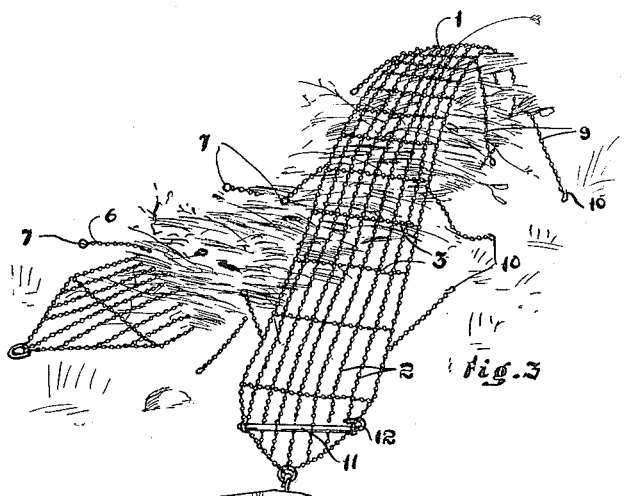

In the drawings, Figure 1 is a plan view of a double row of stalls, showing the carrier spread out in the rear passageway therebetween to receive the straw and manure. Fig. 2 is a plan view similar to Fig. 1, showing the side chains fastened one to the other to bind the carrier with the straw and manure thereon into bundle form. Fig. 3 is a perspective view of the carrier opened out, and half the load dumped therefrom.

Like numerals of reference indicate corresponding parts in each figure.

Referring to the drawings, 1 is the carrier comprising the longitudinal stringer chains 2 and the cross chains 3 interwoven one with the other in mesh form, though it must be understood that the mesh may be formed of cable or rope, or may be partly formed of chain to complete a strip of large open mesh, and filled in with finer chain, rope, wire or cable to make a closer mesh. The strip of mesh material formed as above mentioned is stretched to cover the passageway in the rear of one or two adjoining rows of stalls, the partitions of which are shown at 4 in Figs. 1 and 2. The strip of mesh at each end thereof is finished off to a point and secured to a draft-ring 5.

6 are short lengths of chain secured at intervals along one side of the mesh strip, and having rings 7 secured at the ends thereof. 9 are lengths of chain secured along the opposite side of the mesh to the chain 6, and having the hooks 10 secured at the ends thereof.

11 is a bar having one end thereof provided with a suitable hook 12, whereby said bar may be secured across the mesh fabric by hooking the end into the stringer chains adjacent the edge, thus holding the carrier for the greater portion of its width in a spread position when the draft-ring is hitched to a whiffle-tree as hereinafter described.

In the operation of the carrier when it is spread out as hereinbefore explained, it is of course in position for straw and manure to be placed thereon, and when it is desired to clean the passageway, the chains 9 along the side of the mesh strip are successively passed through the rings of the chains 6 on the opposite side, and the hooks of the chains 9 being then caught back upon their own length of chain. In this way the entire length of the strip is bound into a bundle as shown in Fig. 2, and a team of hores with whiffle-trees hitched to one of the draft-rings 5, whereby the entire length of carrier may be drawn down the passageway, and out the stable door at the end to any place desired for dumping, though it will be found most advantageous to haul the carrier to a field which it is desired to fertilize, and there the same may be dumped in the following manner: The chains 6 and 9 are each unfastened one from the other, and the mesh strip spread out; the bar 11 is now hooked in position across the strip at the forward end thereof, and the strip overhauled in the opposite direction and almost upon itself as shown in Fig. 3, whereby the top and bottom sides are reversed and the load of straw and manure dumped therefrom, the cross-bar keeping the strip extended its full width, in which position it may again be drawn into the stable having accomplished much saving in time and work.

The cross-bar may be unhooked from the carrier if desired while spread in position in the stable, thus leaving all parts of the carrier on the stable floor quite flat and flexible, and ready to again receive a load of straw and manure.

What I claim as my invention is:

A manure carrier comprising longitudinal stringer chains and cross chains interwoven one with the other in mesh form, the strip of mesh at each end being finished off to a point, a draft ring secured to each end, a plurality of short lengths of chain secured at intervals along one side of the mesh strip, rings secured to the ends of said lengths of chain, a second series of lengths of chain secured along the opposite side of the mesh to the first mentioned lengths, hooks secured to said last mentioned lengths, a cross bar secured at opposite ends of the mesh, one end of said cross bar being secured to the mesh and the other end having a hook adapted to catch on to the opposite side of the strip.

Signed at Moosomin, Saskatchewan, this 30th day of July, 1913.

ROBERT HICKS.

Witnesses:
C. A. STEWART,
E. BEUFEL.